United States Patent
Ross et al.

(10) Patent No.: US 10,635,613 B2
(45) Date of Patent: Apr. 28, 2020

(54) TRANSACTION IDENTIFICATION

(71) Applicant: Micron Technology, Inc., Boise, ID (US)

(72) Inventors: Frank F. Ross, Boise, ID (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 250 days.

(21) Appl. No.: 15/484,744

(22) Filed: Apr. 11, 2017

(65) Prior Publication Data

US 2018/0293000 A1 Oct. 11, 2018

(51) Int. Cl.
G06F 3/06 (2006.01)
G06F 13/28 (2006.01)
H04L 1/00 (2006.01)
G06F 13/16 (2006.01)
G06F 11/10 (2006.01)

(52) U.S. Cl.
CPC .......... *G06F 13/28* (2013.01); *G06F 11/1004* (2013.01); *G06F 13/1673* (2013.01); *H04L 1/00* (2013.01)

(58) Field of Classification Search
CPC ........ G06F 13/28; G06F 11/073; G06F 12/08; G06F 13/1673; G06F 11/1004; H04L 1/00
See application file for complete search history.

(56) References Cited

U.S. PATENT DOCUMENTS

| 5,452,311 A | 9/1995 | Wells et al. |
| 5,574,944 A | 11/1996 | Stager |
| 5,590,345 A | 12/1996 | Barker et al. |
| 5,774,683 A | 6/1998 | Gulick |
| 5,937,423 A | 8/1999 | Robinson |
| 7,711,889 B2 | 5/2010 | Kudo et al. |
| 7,870,351 B2 | 1/2011 | Resnick |
| 7,904,644 B1 | 3/2011 | Pinvidic et al. |
| 7,924,521 B1 | 4/2011 | Hudiono et al. |
| 7,983,107 B2 | 7/2011 | Moshayedi et al. |
| 8,719,492 B1 | 5/2014 | Asnaashari |
| 8,874,831 B2 | 10/2014 | Lee et al. |
| 9,128,634 B1 | 9/2015 | Kang et al. |
| 2002/0062459 A1 | 5/2002 | Lasserre et al. |
| 2003/0110322 A1 | 6/2003 | Wolrich et al. |

(Continued)

FOREIGN PATENT DOCUMENTS

| JP | 0561748 A | 3/1993 |
| WO | 2010002753 A1 | 1/2010 |

OTHER PUBLICATIONS

International Search Report and Written Opinion from international patent application No. PCT/US2017/034487, dated Oct. 25, 2017, 22 pp.

(Continued)

*Primary Examiner* — David Yi
*Assistant Examiner* — Zubair Ahmed
(74) *Attorney, Agent, or Firm* — Brooks, Cameron & Huebsch, PLLC

(57) ABSTRACT

The present disclosure includes apparatuses and methods related to transaction identification. An example apparatus can determine a transaction identification (TID) associated with a command by comparing a host transaction identification (TID) record with a memory device transaction identification (TID) record.

26 Claims, 5 Drawing Sheets

(56) References Cited

U.S. PATENT DOCUMENTS

| | | |
|---|---|---|
| 2004/0148482 A1 | 7/2004 | Grundy et al. |
| 2004/0260908 A1 | 12/2004 | Malik et al. |
| 2006/0242332 A1* | 10/2006 | Johnsen .................. G06F 13/28 710/22 |
| 2008/0082751 A1 | 4/2008 | Okin et al. |
| 2008/0189452 A1 | 8/2008 | Merry et al. |
| 2008/0195800 A1 | 8/2008 | Lee et al. |
| 2009/0006787 A1 | 1/2009 | De Souza et al. |
| 2009/0133032 A1 | 5/2009 | Biles et al. |
| 2009/0164869 A1 | 6/2009 | Chuang |
| 2009/0276556 A1 | 11/2009 | Huang |
| 2010/0250827 A1 | 9/2010 | Jullien et al. |
| 2011/0170346 A1 | 7/2011 | Nagai et al. |
| 2011/0320651 A1 | 12/2011 | Poublan et al. |
| 2012/0020161 A1 | 1/2012 | Haukness |
| 2012/0131253 A1 | 5/2012 | McKnight et al. |
| 2012/0159052 A1 | 6/2012 | Lee et al. |
| 2014/0229699 A1 | 8/2014 | Gurgi et al. |
| 2014/0237157 A1* | 8/2014 | Takefman ........... G06F 11/1008 711/3 |
| 2014/0269088 A1 | 9/2014 | Pichen |
| 2014/0351492 A1 | 11/2014 | Chen |
| 2015/0052318 A1 | 2/2015 | Walker |
| 2015/0212738 A1 | 7/2015 | D'eliseo et al. |
| 2015/0234601 A1 | 8/2015 | Tsai et al. |
| 2015/0279463 A1 | 10/2015 | Berke |
| 2015/0331638 A1 | 11/2015 | Zaltsman et al. |
| 2015/0363106 A1 | 12/2015 | Lim et al. |
| 2016/0026577 A1 | 1/2016 | Goodwin |
| 2016/0041907 A1 | 2/2016 | Jung et al. |
| 2016/0070483 A1 | 3/2016 | Yoon et al. |
| 2016/0118121 A1 | 4/2016 | Kelly et al. |
| 2016/0232112 A1 | 8/2016 | Lee |
| 2017/0024297 A1 | 1/2017 | Sogabe |
| 2017/0308306 A1 | 10/2017 | Intrater |
| 2017/0351433 A1 | 12/2017 | Walker et al. |
| 2018/0260329 A1 | 9/2018 | Galbraith et al. |

OTHER PUBLICATIONS

International Search Report and Written Opinion from international application No. PCT/US2017/029780, dated Jul. 18, 2017, 11 pp.
Decision of Rejection from Taiwanese patent application No. 106114938, dated May 24, 2018, 6 pp.
Office Action from related Taiwanese patent application No. 106118556, dated May 11, 2018, 10 pp.
International Search Report and Written Opinion from international application No. PCT/US2018/018106, dated May 28, 2018, 19 pp.
Office Action from Taiwanese patent application No. 106114938, dated Jan. 18, 2018, 7 pp.
Search Report from European patent application No. 17793026.0, dated Mar. 13, 2019, 7 pp.
Office Action from Chinese patent application No. 201780026941.4, dated Jul. 10, 2019, 12 pp.
Office Action from related Taiwan patent application No. 107108757, dated Nov. 8, 2019, 13 pages.

* cited by examiner

TRANSACTION IDENTIFICATION

TECHNICAL FIELD

The present disclosure relates generally to memory devices, and more particularly, to apparatuses and methods for transaction identification.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory can be part of a memory module (e.g., a dual in-line memory module (DIMM)) used in computing devices. Memory modules can include volatile, such as DRAM, for example, and/or non-volatile memory, such as Flash memory or RRAM, for example. The DIMMs can be using a main memory in computing systems.

DETAILED DESCRIPTION

Figure 1A:
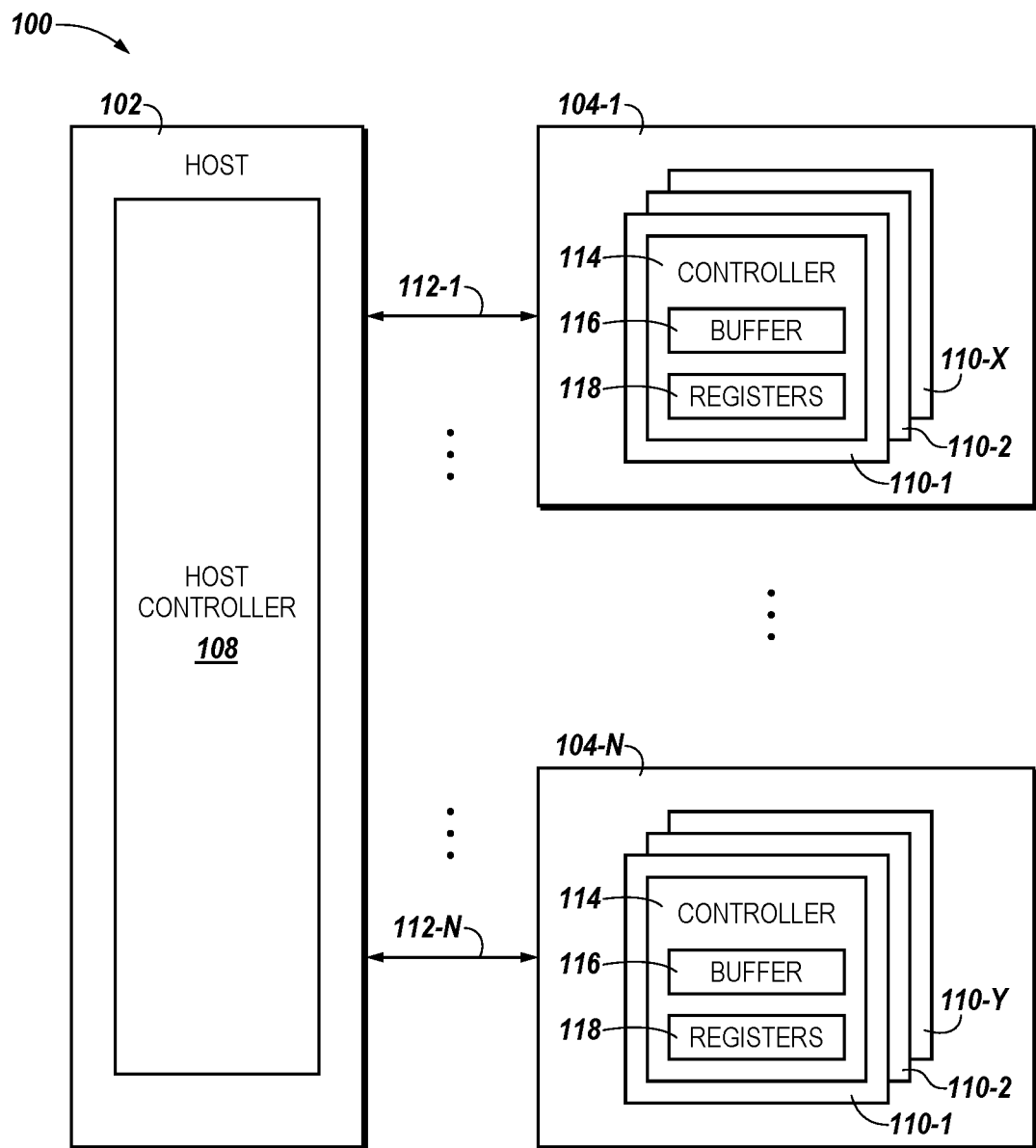
FIG. 1A is a block diagram of an apparatus in the form of a computing system including a memory system in accordance with a number of embodiments of the present disclosure.

The present disclosure includes apparatuses and methods related to transaction identification. An example apparatus can determine a transaction identification (TID) associated with a command by comparing a host transaction identification (TID) record with a memory device transaction identification (TID) record.

In one or more embodiments of the present disclosure, a host controller can be configured to query a memory device with a status request in response to receiving a transmission error associated with a command, receive a memory device transaction identification (TID) record from the memory device, and determine a transaction identification (TID) associated with the command by comparing a host transaction identification (TID) record with the memory device TID record. The host controller can be configured to receive data with a command from the memory device. The host controller can also be configured to detect a transmission error, which can include a corrupt TID, in the data associated with the command. The host controller then queries the memory device in response to receiving the transmission error.

In one or more embodiments of the present disclosure, the host controller determines the TID associated with the command by identifying a TID in the memory device TID record that is missing from the host TID. The host controller can then re-requests data by sending a command again with the determined TID. Then the host controller can receive the data with the command from the memory device.

In one or more embodiments of the present disclosure, a first TID and second TID can be generated corresponding to a first and second command. The first and second TIDs can be stored. Storing the first and second TIDs can be executed in a memory controller. The first command with the first TID can be sent to the memory device and the second command with the second TID can be sent to the memory device. In one or more embodiments the first command and the second command can be a read operation command. First output data from the memory device can be provided. The first output data can comprise a first operation result based on the first command and a third TID accompanied with the first operation result, the third TID corresponding to the first TID. Second output data from the memory device can be provided. The Second output data can comprise a second operation result based on the second command and a fourth TID accompanied with the second operation result, the fourth TID corresponding to the second TID. When a transmission error is found in one of the third and fourth TIDs the first and second TIDs can be outputted.

In one or more embodiments of the present disclosure, the third and fourth TIDs can be compared to the outputted first and second TIDs to identify the one of the returned first and second TIDs including the transmission error. Comparing the third and fourth TIDs to the outputted first and second TIDs can be executed in a host. The first command with the first TID can be re-sent to the memory device if the third TID is identified as including the transmission error. In one or more embodiments the third TID can be outputted earlier than the first operation result from the memory device and the fourth TID can be outputted earlier than the second operation result from the memory device.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1A is a functional block diagram of a computing system 100 including an apparatus in the form of a number of memory systems 104-1 ... 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1A, memory systems 104-1 ... 104-N can include a one or more dual in-line memory modules (DIMM) 110-1, ..., 110-X, 110-Y. The DIMMs 110-1, ..., 110-X, 110-Y can include volatile memory and/or non-volatile memory. In a number of embodiments, memory systems 104-1, ..., 104-N can include a multi-chip device. A multi-chip device can include a number of different memory types and/or memory modules. For example, a memory system can include non-volatile or volatile memory on any type of a module. The examples described below in association with FIGS. 1A-5 use a DIMM as the memory module, but the protocol of the present disclosure can be used on any memory system where memory can execute non-deterministic commands. In FIG. 1A, memory system 104-1 is coupled to the host via channel 112-1 can include DIMMs 110-1, ..., 110-X, where DIMM 110-1 is a NVDIMM and 110-X is DRAM DIMM. In this example, each DIMM 110-1, ..., 110-X, 110-Y includes a controller 114. Controller 114 can received commands from host 102 and control execution of the commands on a DIMM. Also, in a number of embodiments, the protocol of the present disclosure could be implemented by a memory device (e.g., a DIMM) without a controller and execution of the commands using the protocol of the present disclosure could be built into the memory device. The host 102 can send commands to the DIMMs 110-1, ..., 110-X, 110-Y using the protocol of the present disclosure and/or a prior protocol, depending on the type of memory in the DIMM. For example, the host can use the protocol of the present disclosure to communicate on the same channel (e.g., channel 112-1) with a NVDIMM and a prior protocol to communicate with a DRAM DIMM that are both on the same memory system. The host and the NVDIMM can communicate via read ready (R_RDY) signals, read send (R_SEND) signals, write credit increment (WC_INC) signals, and read identification (RID) signals according the protocol of the present disclosure. The read ready (R_RDY) signals, read send (R_SEND) signals, write credit increment (WC_INC) signals, and read identification (RID) signals can be sent via pins that are unused in a prior protocol (e.g. DDR4) or are pins from a prior protocol (e.g. DDR4) that are repurposed (e.g. used differently) so that the present protocol is compatible with the prior protocol. Also, pins can be assigned to the read ready (R_RDY) signals, read send (R_SEND) signals, write credit increment (WC_INC) signals, and read identification (RID) signals in protocols that are being developed (e.g., DDR5).

As illustrated in FIG. 1A, a host 102 can be coupled to the memory systems 104-1 ... 104-N. In a number of embodiments, each memory system 104-1 ... 104-N can be coupled to host 102 via a channel. In FIG. 1A, memory system 104-1 is coupled to host 102 via channel 112-1 and memory system 104-N is coupled to host 102 via channel 112-N. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 includes a host controller 108 to communicate with memory systems 104-1 ... 104-N. The host controller 108 can send commands to the DIMMs 110-1, ..., 110-X, 110-Y via channels 112-1 ... 112-N. The host controller 108 can communicate with the DIMMs 110-1, ..., 110-X, 110-Y and/or the controller 114 on each of the DIMMs 110-1, ..., 110-X, 110-Y to read, write, and erase data, among other operations. A physical host interface can provide an interface for passing control, address, data, and other signals between the memory systems 104-1 ... 104-N and host 102 having compatible receptors for the physical host interface. The signals can be communicated between 102 and DIMMs 110-1, ..., 110-X, 110-Y on a number of buses, such as a data bus and/or an address bus, for example, via channels 112-1 ... 112-N.

The host controller 108 and/or controller 114 on a DIMM can include control circuitry, e.g., hardware, firmware, and/or software. In one or more embodiments, the host controller 108 and/or controller 114 can be an application specific integrated circuit (ASIC) coupled to a printed circuit board including a physical interface. Also, each DIMM 110-1, ..., 110-X, 110-Y can include buffers 116 of volatile and/or non-volatile memory and registers 118. Buffer 116 can be used to buffer data that is used during execution of read commands and/or write commands. The buffer 116 can be split into a write buffer and a read buffer. The amount of space that is dedicated to the write buffer and the amount of space dedicated to the read buffer can be controlled by the host controller 108. The host can control the amount of space in the buffer 116 dedicated to the write buffer and the read buffer based on the type of commands that are being sent to a particular DIMM. In a number of embodiments, the DIMM can have a fixed write buffer size and/or a fixed read buffer size. Registers 118 can be programmed with priority information to determine priority for executing commands.

The DIMMs 110-1, ..., 110-X, 110-Y can provide main memory for the memory system or could be used as additional memory or storage throughout the memory system. Each DIMM 110-1, ..., 110-X, 110-Y can include one or more arrays of memory cells, e.g., non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1A can include additional circuitry that is not illustrated so as not to obscure embodiments of the present disclosure. For example, the memory systems 104-1 . . . 104-N can include address circuitry to latch address signals provided over I/O connections through I/O circuitry. Address signals can be received and decoded by a row decoder and a column decoder to access the DIMMs 110-1, . . . , 110-X, 110-Y. It will be appreciated by those skilled in the art that the number of address input connections can depend on the density and architecture of the DIMMs 110-1, . . . , 110-X, 110-Y.

Figure 1B:
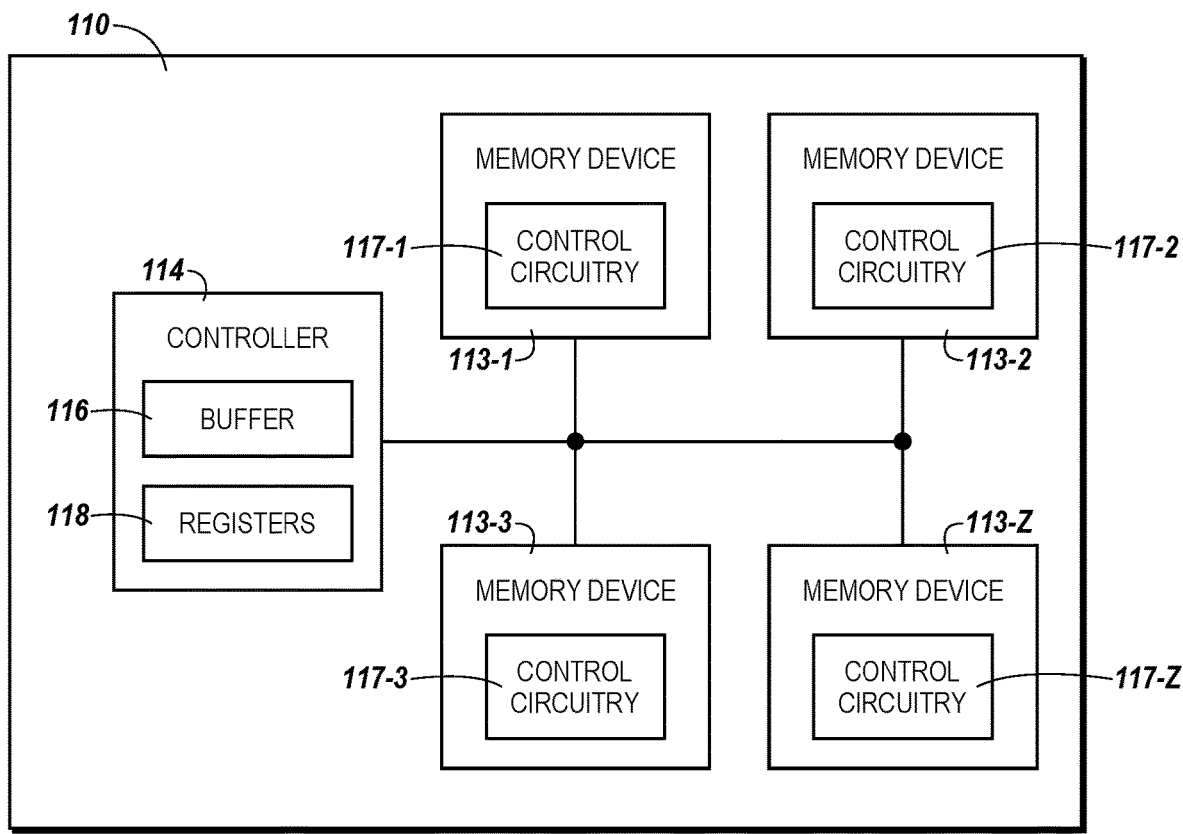
FIG. 1B is a block diagram of an apparatus in the form of a dual in-line memory modules (DIMM) in accordance with a number of embodiments of the present disclosure.

FIG. 1B is a block diagram of an apparatus in the form of a dual in-line memory modules (DIMM) 110 in accordance with a number of embodiments of the present disclosure. In FIG. 1B, DIMM 110 can include a controller 114. Controller 114 can include memory, such as SRAM memory, that can be a buffer 116 and/or a number of registers 118. DIMM 110 can include a number of memory devices 113-1, . . . , 113-Z coupled to the controller. Memory devices 113-1, . . . , 113-Z can include non-volatile memory arrays and/or volatile memory arrays. Memory devices 113-1, . . . , 113-Z can include control circuitry 117 (e.g., hardware, firmware, and/or software) which can be used to execute commands on the memory devices 113-1, . . . , 113-Z. The control circuitry 117 can receive commands from controller 114. The control circuitry 117 can be configured to execute commands to read and/or write data in the memory devices 113-1, . . . , 113-Z.

Figure 2:
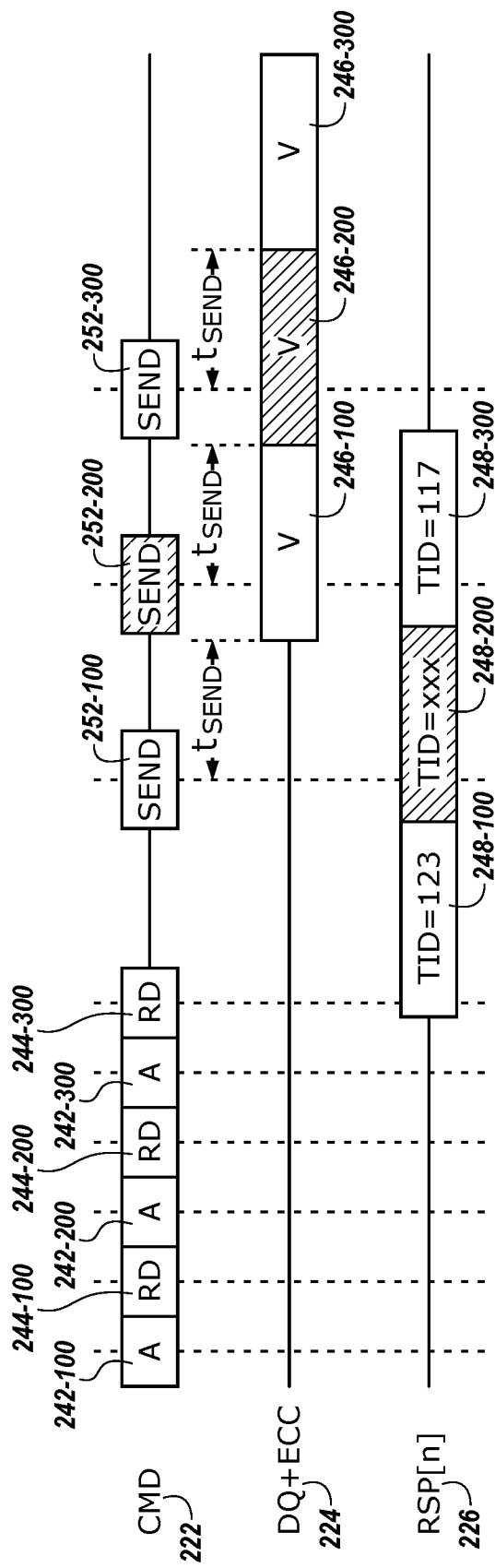
FIG. 2 is a diagram of a number of operations in accordance with a number of embodiments of the present disclosure.

FIG. 2 is a diagram of a number of operations in accordance with a number of embodiments of the present disclosure. FIG. 2 illustrates an example of performing three read operations. A command signal 222 can be sent from the host to the memory device (e.g. memory device 113 in FIG. 1B). Command signal 222 can include activate commands and read commands. In FIG. 2, a first activate command 242-100, a first read command 244-100, a second activate command 242-200, a second read command 244-200, a third activate command 242-300, and a third read command 244-300 are sent from the host (e.g. host 102 in FIG. 1A) to the memory device (e.g. memory device 113 in FIG. 1B). The host (e.g. host 102 in FIG. 1A) can assign a transaction identification (TID) number to the read command. The TID numbers are identifiers generated by the host (e.g. host 102 in FIG. 1A). The TID can be an implicit TID generated by the host (e.g. host 102 in FIG. 1A) and the memory device (e.g. memory device 113 in FIG. 1B) simultaneously. An implicit TID can occur following a synchronization event, TID information can be maintained on both the host and memory device separately and provide a method for recovery from erroneous transaction identifiers. The TID numbers can be included in the read command and transmitted to the memory device (e.g. memory device 113 in FIG. 1B) when sending the read command from the host (e.g. host 102 in FIG. 1A) to the memory device (e.g. memory device 113 in FIG. 1B). In FIG. 2, first read command 244-100 can be assigned a TID of 123, the second read command 244-200 can be assigned a TID of 131, and the third read command 244-300 can be assigned a TID of 117.

In response to receiving the read commands 244-100, . . . , 244-300, the memory device (e.g. memory device 113 in FIG. 1B) can inspect the buffer and/or cache of the memory device (e.g. memory device 113 in FIG. 1B) and in the non-volatile memory of the memory device (e.g. memory device 113 in FIG. 1B) to locate the data associated with the read commands 244-100, . . . , 244-300. The memory device (e.g. memory device 113 in FIG. 1B) can execute operations in an order that is different from the order in which the commands were received by the memory device (e.g. memory device 113 in FIG. 1B). Once the memory device (e.g. memory device 113 in FIG. 1B) locates the data and has the data ready to send back to the host (e.g. host 102 in FIG. 1A), the memory device (e.g. memory device 113 in FIG. 1B) can send a read ready command to the host (e.g. host 102 in FIG. 1A). A read ready indicator can be sent to the host (e.g. host 102 in FIG. 1A) by toggling (e.g., transitioning) a read ready signal from low to high or high to low to indicate that the data associated command 244-100 is ready to be sent to the host (e.g. host 102 in FIG. 1A). The host (e.g. host 102 in FIG. 1A) can detect the read ready indicator by detecting the transition of the read ready signal. In response to receiving the read ready indicator, the host (e.g. host 102 in FIG. 1A) can send a read send indicator to the memory device controller (e.g. memory device controller 114 in FIG. 1A) to indicate that the host (e.g. host 102 in FIG. 1A) is ready to receive the data associated with command 244-100. The memory device controller (e.g. memory device controller 114 in FIG. 1A) can, in response to receiving the read send indicator, send the data 246-100, . . . , 246-300 associated with command 244-100, . . . , 244-300 on the DQ+ECC pins 224. Also, a TID signal 248-100, . . . , 248-300 is sent to the host on the RSP[n] pins 226 when data 246-100, . . . , 246-300 is sent to the host. The TID signal 248-100, . . . 248-300 includes the TID number assigned to the chunk of data by the memory device (e.g. memory device 113 in FIG. 1B) and is used to identify the read command associated with data 246-100, . . . , 246-300 that is sent to the host (e.g. host 102 in FIG. 1A). Data 246-100 is assigned a TID number of 123, data 246-200 is assigned a TID number but during transmission becomes corrupt, and data 246-300 is assigned a TID number of 117.

Figure 3A:
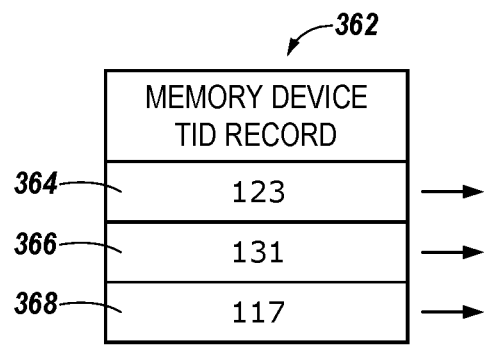
FIGS. 3A-3B are tables illustrating transaction identification (ID) records.
Figure 3B:
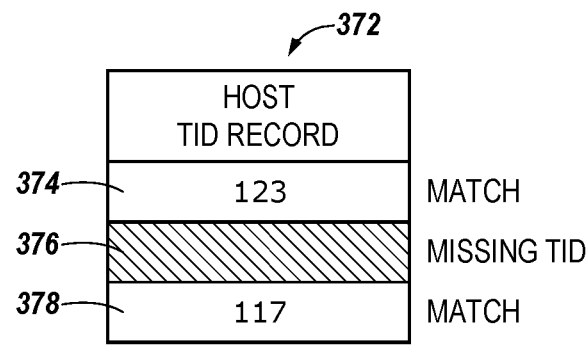

FIGS. 3A-3B are tables illustrating transaction identification (TID) records. FIG. 3A illustrates an example of a memory device transaction identification (TID) record. The memory device TID record 362 can be stored for a set period of time. For example, the memory device TID record 362 can be stored in the buffer (e.g. buffer 116 in FIG. 1A). The size of the buffer (e.g. buffer 116 in FIG. 1A) can be based on the number of outstanding requests from the host device (e.g. host 102 in FIG. 1A) to the memory device (e.g. memory device 113 in FIG. 1B). The memory device transaction identification (TID) record 362 includes a first memory device transaction identification (TID) 364, a second memory device transaction identification (TID) 366, and a third memory device transaction identification (TID) 368. A host may determine that a host TID is corrupt or erroneous based on an error detection scheme used in the TID transmission or by a false match to its corresponding memory device TID. An error detection scheme includes, for example, parity of error correction code (ECC) error.

FIG. 3B illustrates an example of a host transaction identification (TID) record. The host TID record 372 can be stored in the controller (e.g. controller 114 in FIG. 1A) and is a record of the TIDSs that have been transmitted back to the host (e.g. host 102 in FIG. 1A). The host TID record 372 includes a first host transaction identification (TID) 374, a second host transaction identification (TID) 376, and a third host transaction identification (TID) 378. The first memory device TID 364 corresponds to the first host TID 374, the second memory device TID 366 corresponds to the second host TID 376, and the third memory device TID record 368 corresponds to the third host TID 378. In FIG. 3B the second host TID 376 was determined to be a corrupt value by the host (e.g. host 102 in FIG. 1A) on receipt. As a result, the host (e.g. host 102 in FIG. 1A) can query the memory device using a STATUS request command or a MODE REGISTER READ command for the memory device TID record 362.

Once the host (e.g. host 102 in FIG. 1A) receives the memory device TID record 362, the host (e.g. host 102 in FIG. 1A) can compare a host TID record 372 to the memory device TID record 362. The host (e.g. host 102 in FIG. 1A) can determine the corrupt TID associated with a command by identifying a TID in the memory device TID record 362 that is missing from the host TID record 372. For example, the memory device TID record 362 has the first memory device TID 364, the second memory device TID 366, and the third memory device TID 368. However, the host TID record only has the first host TID 374 that corresponds to the first memory device TID 364 and the third host TID 378 that corresponds to the third memory device TID 368. Therefore the host (e.g. host 102 in FIG. 1A) can determine that TID host record 376, the memory device TID 366, is missing from the host TID record. The host (e.g. host 102 in FIG. 1A) can then send the determined TID associated with the command to the memory device (e.g. memory device 113 in FIG. 1B) again and receive the data from the memory device (e.g. memory device 113 in FIG. 1B) associated with the previously corrupt TID.

Figure 4:
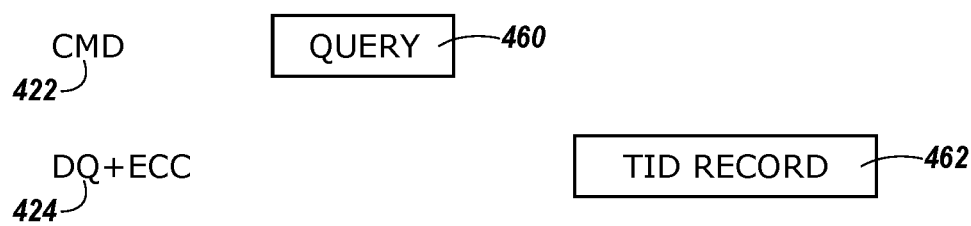
FIG. 4 is a diagram of a number of operations in accordance with a number of embodiments of the present disclosure.

FIG. 4 is a diagram of a number of operations in accordance with a number of embodiments of the present disclosure. In one or more embodiments of the present disclosure, a host controller can be configured to query the memory device with a status request in response to receiving a transmission error, including a corrupt TID, associated with a command, and receive a memory device TID record from the memory device. FIG. 4 illustrates an example of performing a query operation to request the memory device TID record (e.g. memory device TID record 362 in FIG. 3A. The command signal 422 can be sent from the host (e.g. host 102 in FIG. 1A) to the memory device (e.g. memory device 113 in FIG. 1B). Query 460 can include a STATUS request command or a MODE REGISTER READ command. Once the memory device (e.g. memory device 113 in FIG. 1B) has received the command, the memory device (e.g. memory device 113 in FIG. 1B) in response can send a memory device transaction identification (TID) record 462 on the DQ+ECC pins 424. The host (e.g. host 102 in FIG. 1A) can then determine a TID associated with the command by comparing the host TID record (e.g. host TID record 372 in FIG. 3B with the memory device TID record 462. The host controller (e.g. host controller 108 in FIG. 1A) can then query the memory device (e.g. memory device 113 in FIG. 1B) in response to identifying the TID associated with the command by re-requesting data via sending a command again with the TID associated with the command. The host (e.g. host 102 in FIG. 1A) can then receive the data with the command from the memory device (e.g. memory device 113 in FIG. 1B).

Figure 5:
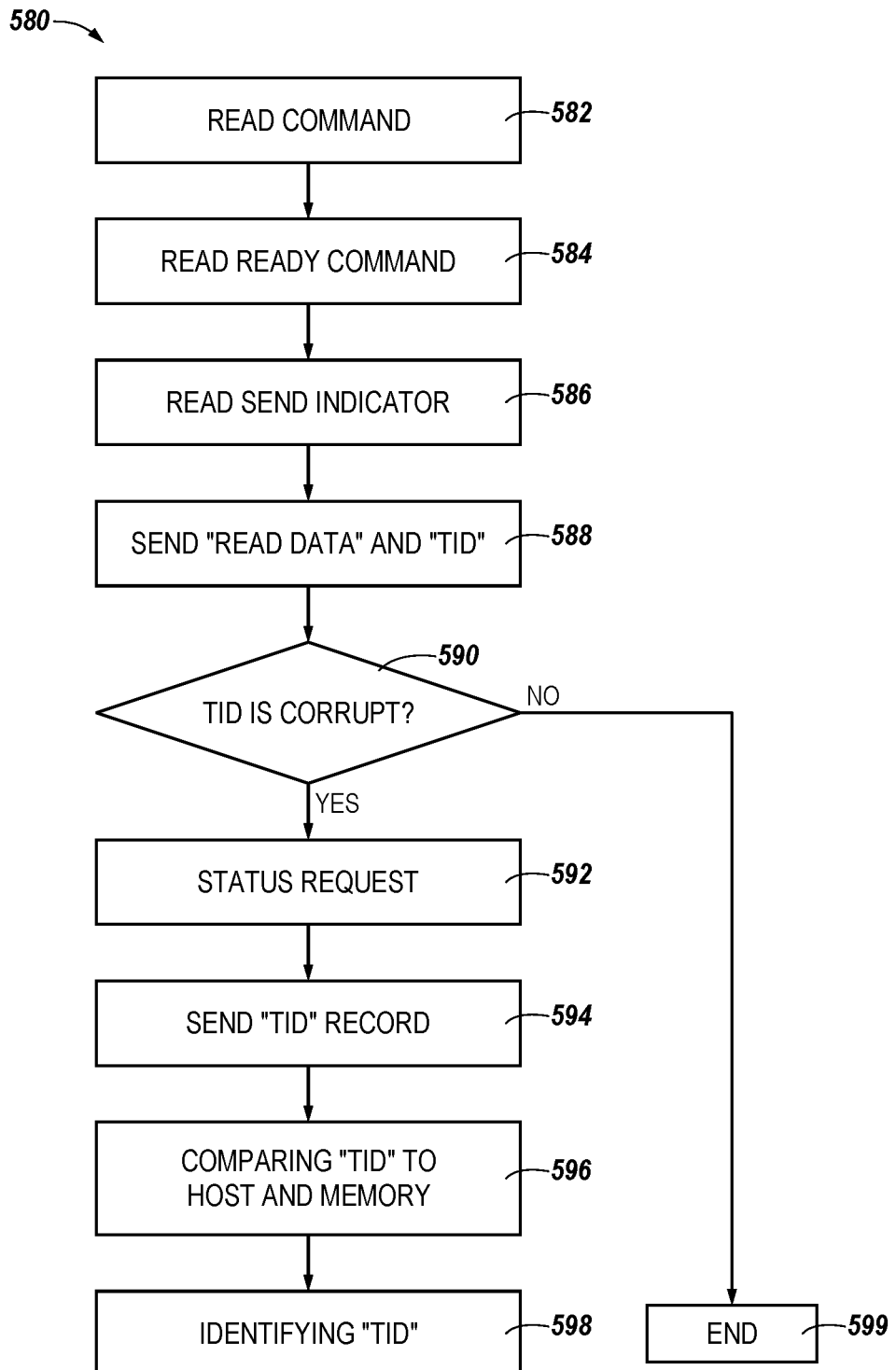
FIG. 5 illustrates an example of a flow chart for transaction identification in accordance with a number of embodiments of the present disclosure.

FIG. 5 illustrates an example of a flow chart for transaction identification in accordance with a number of embodiments of the present disclosure. A read command 582 with a TID can be sent to the memory device (e.g. memory device 113 in FIG. 1B) from the host (e.g. host 102 in FIG. 1A). Once the memory device locates the data and has the data ready to send back to the host, the memory device can send a read ready command 584 to the host. In response to receiving the read ready command 584, the host can send a read send indicator 586 to the memory device controller to indicate that the host is ready to receive the data associated with the command (e.g. data associated with command 244-100 in FIG. 2). The memory device controller (e.g. memory device controller 114 in FIG. 1A) can, in response to receiving the read send indicator 586, send the read data and TID 588. Then the host can determine whether the TID is corrupt 590. If the TID is not corrupt then the process ends 599. If the TID is corrupt the host can query the memory device using a STATUS request 592 for the memory device TID record (e.g. memory device TID record 362 in FIG. 3). The memory device after receiving the STATUS request 592 can send the TID record 594. Once the host (e.g. host 102 in FIG. 1A) receives the memory device TID record (e.g. memory device TID record 362 in FIG. 3), the host can compare 596 a host TID record (e.g. host TID record 372 in FIG. 3) to the memory device TID record (e.g. memory device TID record 362 in FIG. 3). The host can identify TID 598 that is corrupt by determining the memory device TID record (e.g. memory device TID record 362 in FIG. 3) that is missing from the host TID record (e.g. host TID record 372 in FIG. 3).

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. An apparatus, comprising:
a memory device including a buffer; and
a host device coupled to the memory device, wherein the host device includes a host controller configured to:
determine a corrupt transaction identification (TID) associated with a command by comparing a host transaction identification (TID) record including host transaction identifications (TIDs) transmitted to the host device from the memory device and stored in the host controller of the host device with a memory device transaction identification (TID) record stored in the buffer, wherein a memory device transaction identification (TID) corresponding to a host transaction identification (TID) missing from the host TID record is the corrupt TID associated with the command; and output the memory device TID associated with the command from the host device to the memory device in response to determining the corrupt TID associated with the command.

2. The apparatus of claim 1, wherein the host device is configured to send the command to the memory device.

3. The apparatus of claim 1, wherein the host is configured to generate transaction identifications (TIDs) as identifiers.

4. The apparatus of claim 1, wherein the host is configured to determine a transmission error based on an error detection scheme used in a TID transmission.

5. The apparatus of claim 1, wherein the memory device is a non-volatile dual in-line memory module (NVDIMM).

6. An apparatus, comprising:
a memory device including a buffer; and
a host device coupled to the memory device, wherein the host device includes a host controller configured to:
query the memory device with a status request in response to receiving a transmission error associated with a command;
receive a memory device transaction identification (TID) record from the buffer in the memory device;
determine a corrupt transaction identification (TID) associated with the command by comparing a host transaction identification (TID) record including host transaction identifications (TIDs) transmitted from the memory device to the host device and stored in the host controller of the host device with the memory device TID record, wherein a memory device transaction identification (TID) corresponding to a host transaction identification (TID) missing from the host TID record is the corrupt TID associated with the command; and
output the memory device TID associated with the command from the host device to the memory device in response to determining the corrupt TID associated with the command.

7. The apparatus of claim 6, wherein the memory device is configured to send the memory device TID record in response to receiving the query.

8. The apparatus of claim 6, wherein the memory device TID associated with the command is an implicit TID generated by the host device and the memory device simultaneously.

9. The apparatus of claim 6, wherein the memory device is configured to execute operations in an order that is different from an order in which the commands are received by the memory device.

10. An apparatus, comprising:
a memory device including a buffer; and
a host device coupled to the memory device, wherein the host device includes a host controller configured to:
receive data with a command from the memory device;
detect a transmission error in the data associated with the command;
query the memory device in response to receiving the transmission error;
receive a memory device transaction identification (TID) record from the buffer in the memory device;
determine a corrupt transaction identification (TID) associated with the command by comparing a host transaction identification (TID) record including host transaction identifications (TIDs) transmitted from the memory device to the host device and stored in the host controller of the host device with the memory device TID record, wherein a memory device transaction identification (TID) corresponding to a host transaction identification (TID) missing from the host TID record is the corrupt TID associated with the command; and
output the memory device TID associated with the command from the host device to the memory device in response to determining the corrupt TID associated with the command.

11. The apparatus of claim 10, wherein the query is a status request command.

12. The apparatus of claim 10, wherein the query is a mode register read command for the memory device TID record.

13. The apparatus of claim 10, wherein the buffer stores the memory device TID record for a set period of time.

14. The apparatus of claim 13, wherein a size of the buffer is based on the speed of transactions from the host device to the memory device.

15. The apparatus of claim 10, wherein the transmission error includes the corrupt TID.

16. The apparatus of claim 10, wherein the host device is configured to receive the data with the command from the memory device after the host device sends a command to the memory device.

17. A method, comprising:
generating first and second transaction identifications (TIDs), the first and second TIDs corresponding to first and second commands, respectively;
sending the first command with the first TID to a memory device;
sending the second command with the second TID to the memory device;
storing the first and second TIDs in a buffer in the memory device;
providing a first output data from the memory device to a host, the first output data comprising a first operation result based on the first command and a third transaction identification (TID) accompanied with the first operation result, the third TID corresponding to the first TID;
providing a second output data from the memory device to the host, the second output data comprising a second operation result based on the second command and a fourth transaction identification (TID) accompanied with the second operation result, the fourth TID corresponding to the second TID;
storing the third and fourth TIDs in a host controller of the host;
providing a memory device transaction identification (TID) record from the memory device to the host, wherein the memory device TID record includes the first and second TIDs;
comparing the third and fourth TIDs to the first and second TIDs to identify the third TID or the fourth TID including a transmission error; and
sending the first command with the first TID from the host to the memory device responsive to the third TID including the transmission error or sending the second command with the second TID from the host to the memory device responsive to the fourth TID including the transmission error.

18. The method of claim 17, wherein each of the first command and the second command is a read operation command.

19. The method of claim 17, wherein the third TID is outputted earlier than the first operation result from the memory device and the fourth TID is outputted earlier than the second operation result from the memory device.

20. The method of claim 17, wherein comparing the third and fourth TIDs to the outputted first and second TIDs is executed in a host.

21. A method, comprising:
- receiving a transmission error associated with a command from a memory device including a buffer;
- querying the memory device in response to receiving the transmission error; receiving a memory device transaction identification (TID) record from the buffer in the memory device;
- determining a corrupt transaction identification (TID) associated with the command by identifying a transaction identification (TID) in the memory device TID record corresponding to a host transaction identification (TID) that is missing from a host transaction identification (TID) record by comparing the memory device TID record with the host TID record, wherein the host TID record includes host transaction identifications (TIDs) transmitted to a host device from the memory device and stored in a host controller of the host device; and
- outputting the memory device TID associated with the command from the host device to the memory device in response to determining the corrupt TID associated with the command.

22. The method of claim 21, wherein querying the memory device comprises using a status request command.

23. The method of claim 21, wherein querying the memory device comprises using a mode register command for the memory device TID record.

24. The method of claim 21, further comprising executing operations in an order that is different from an order in which the commands are received by the memory device.

25. The method of claim 21, further comprising storing the memory device TID record for a set period of time.

26. The method of claim 25, further comprising setting a size of the buffer based on speed of transactions from a host device to the memory device.

* * * * *